(12) United States Patent
Muhanna et al.

(10) Patent No.: US 9,813,948 B2
(45) Date of Patent: *Nov. 7, 2017

(54) SUPPORT FOR CONTINUITY OF TUNNEL COMMUNICATIONS FOR MOBILE NODES HAVING MULTIPLE CARE OF ADDRESSING

(71) Applicant: Apple Inc., Cupertino, CA (US)

(72) Inventors: Ahmad Muhanna, Richardson, TX (US); Mohamed Khalil, Murphy, TX (US); Barnaba Barnowski, Calgary (CA); Eric Parsons, Stittsville (CA); Khosrow Saboorian, Plano, TX (US)

(73) Assignee: Apple Inc., Cupertino, CA (US)

(*) Notice: Subject to any disclaimer, the term of this patent is extended or adjusted under 35 U.S.C. 154(b) by 280 days.

This patent is subject to a terminal disclaimer.

(21) Appl. No.: 14/688,253

(22) Filed: Apr. 16, 2015

(65) Prior Publication Data

US 2015/0223120 A1    Aug. 6, 2015

Related U.S. Application Data

(63) Continuation of application No. 13/661,203, filed on Oct. 26, 2012, now Pat. No. 9,036,601, which is a
(Continued)

(51) Int. Cl.
*H04W 36/00* (2009.01)
*H04W 8/04* (2009.01)
(Continued)

(52) U.S. Cl.
CPC ......... *H04W 36/0016* (2013.01); *H04W 8/04* (2013.01); *H04W 8/28* (2013.01);
(Continued)

(58) Field of Classification Search
CPC ....... H04W 8/28; H04W 8/04; H04W 88/005; H04W 36/0016; H04W 80/04; H04W 60/005
See application file for complete search history.

(56) References Cited

U.S. PATENT DOCUMENTS 6,534,376 B2   3/2003   Tews
7,269,166 B2   9/2007   Koskiahde et al.
(Continued)

FOREIGN PATENT DOCUMENTS

EP    1739901    10/2007

OTHER PUBLICATIONS

Calhoun et al.; "Low Latency Handoff in Mobile 1Pv4;" MIPv4 Handoffs Design Team, Mobile IP Working Group, Internet Engineering Task Force (IETF), May 2001, <draft-ietf-mobileip-lowlatency-handoffs-v4-01.txt>; pp. 1-26.
(Continued)

*Primary Examiner* — Jung-Jen Liu
(74) *Attorney, Agent, or Firm* — Meyertons, Hood, Kivlin, Kowert & Goetzel, P.C.

(57) ABSTRACT

The present invention solves communication disruption problems during the hand-off transition period by using a pre-handoff registration of a new foreign agent on behalf of the mobile node The pre-handoff registration message should: (1) identify itself as a pre-hand off registration message, (2) indicate direction of traffic for the pre-handoff registration time period, and (3) specify a lifetime or time period when the pre-handoff registration request will continue to be considered valid The local mobility anchor will accept traffic using the pre-handoff registration care-of address depending on the directionality indicator, but the communication traffic to or from the mobile node will not be disrupted during the transition period. Because the care-of address for the mobile node on the new foreign network can be used to direct communication traffic to or from the mobile node during this transition time period, no disruption of service will be encountered.

20 Claims, 1 Drawing Sheet

Related U.S. Application Data continuation of application No. 12/744,258, filed as application No. PCT/US2008/012951 on Nov. 20, 2008, now Pat. No. 8,325,680.

(60) Provisional application No. 60/991,023, filed on Nov. 29, 2007, provisional application No. 60/989,546, filed on Nov. 21, 2007.

(51) Int. Cl.
*H04W 8/28* (2009.01)
*H04W 60/00* (2009.01)
*H04W 80/04* (2009.01)
*H04W 88/00* (2009.01)

(52) U.S. Cl.
CPC .......... *H04W 60/005* (2013.01); *H04W 80/04* (2013.01); *H04W 88/005* (2013.01)

(56) References Cited

U.S. PATENT DOCUMENTS

| | | |
|---|---|---|
| 7,284,068 B1 | 10/2007 | Ramalho |
| 7,313,119 B2 | 12/2007 | Suh et al. |
| 7,342,903 B2 | 3/2008 | O'Neill et al. |
| 7,630,340 B2 | 12/2009 | Jung et al. |
| 7,710,921 B2 | 5/2010 | Matsumoto |
| 7,840,217 B2 | 11/2010 | Patel et al. |
| 7,885,248 B2 | 2/2011 | Harper et al. |
| 8,000,299 B2 | 8/2011 | Lee |
| 8,005,093 B2 | 8/2011 | Huang et al. |
| 8,009,614 B2 | 8/2011 | Oguchi |
| 8,051,198 B2 | 11/2011 | Sudo |
| 8,102,815 B2 | 1/2012 | Krishnan |
| 8,121,047 B2 | 2/2012 | Patil |
| 2003/0026241 A1* | 2/2003 | Ono .................. H04L 45/04 370/349 |
| 2003/0036241 A1 | 2/2003 | Ono et al. |
| 2003/0104814 A1 | 6/2003 | Gwon et al. |
| 2003/0224758 A1 | 12/2003 | O'Neill et al. |
| 2004/0105408 A1 | 6/2004 | Suh et al. |
| 2004/0136348 A1 | 7/2004 | Han |
| 2004/0136384 A1 | 7/2004 | Cho |
| 2004/0246939 A1 | 12/2004 | Koskiahde et al. |
| 2005/0213540 A1 | 9/2005 | Matsumoto |
| 2006/0018291 A1 | 1/2006 | Patel et al. |
| 2006/0029020 A1 | 2/2006 | Jung et al. |
| 2006/0062248 A1 | 3/2006 | Huang et al. |
| 2006/0153136 A1 | 7/2006 | Lee |
| 2008/0062917 A1 | 3/2008 | Oguchi |
| 2008/0176560 A1* | 7/2008 | Dutta .................. H04W 12/06 455/433 |
| 2008/0207206 A1 | 8/2008 | Taniuchi et al. |
| 2008/0285518 A1 | 11/2008 | Dutta et al. |
| 2009/0016364 A1 | 1/2009 | Krishnan |
| 2009/0073935 A1 | 3/2009 | Xia et al. |
| 2009/0094693 A1 | 4/2009 | Patil |
| 2010/0027509 A1 | 2/2010 | Velev et al. |
| 2010/0172293 A1 | 7/2010 | Toth et al. |

OTHER PUBLICATIONS

Gundavelli et al.; "Localized Mobility Management using Proxy Mobile 1Pv6;" Internet Engineering Task Force (IETF) Standard Working Draft, Nov. 8, 2005, <draft-gundavelli-netlmm-mip6-proxy-OO.txt>; pp. 1-31.
U.S. Appl. No. 13/661,203, filed Oct. 26, 2012, Ahmad Muhanna.

* cited by examiner

SUPPORT FOR CONTINUITY OF TUNNEL COMMUNICATIONS FOR MOBILE NODES HAVING MULTIPLE CARE OF ADDRESSING

RELATED APPLICATION DATA

This application is a continuation of U.S. patent application Ser. No. 13/661,203, filed Oct. 26, 2012, which is a continuation of U.S. application Ser. No. 12/744,258, filed on May 21, 2010, which is a National Phase Entry of PCT/US2008/12951, filed on Nov. 20, 2008, which claims the benefit of prior U.S. Provisional Patent Application Ser. Nos. 60/989,546 filed on Nov. 21, 2007 and 60/991,023 filed on Nov. 29, 2007, which are all incorporated herein by reference, as if set forth fully and completely herein.

TECHNICAL FIELD OF THE INVENTION

A method for supporting assuring continuity of tunneled communications with a mobile node on a communication system using pre-handoff registration indicators or options.

BACKGROUND OF THE INVENTION

IP-based mobile systems provide for communication between at least one mobile node and a wireless communication network. The term "mobile node" includes a mobile communication unit (e.g., mobile terminal, "smart phones", nomadic devices such as laptop PCs with wireless connectivity, as described in greater detail below). Among other elements, the wireless communication system includes a home network and a foreign network. The mobile node may change its point of attachment to the Internet through these networks, but the mobile node will always be associated with a single home network for IP addressing purposes. The home network includes a home agent and the foreign network includes a foreign agent—both of which control the routing of information packets into and out of their network. Generally, there may also be a correspondence node associated with the system, which may be a mobile or fixed node located on one of the networks that communicates with the mobile node.

The mobile node, home agent and foreign agent may be called different names depending on the nomenclature used on any particular network configuration or communication system. For instance, a "mobile node" encompasses PC's having cabled (e.g., telephone line ("twisted pair"), Ethernet cable, optical cable, and so on) connectivity to the wireless network, as well as direct wireless connectivity to the cellular network. Direct wireless connectivity to a cellular network is supported by various makes and models of mobile terminals ("cell phones") having various features and functionality, such as Internet access, e-mail, messaging services, and the like. Mobile nodes are sometimes called a user equipment, mobile unit, mobile terminal, mobile device, or similar names depending on the nomenclature adopted by particular system providers.

A home agent may also be referred to as a local mobility anchor, home mobility manager, home location register, and a foreign agent may be referred to as a mobile access gateway, serving mobility manager, visited location register, and visiting serving entity. The terms mobile node, home agent and foreign agent are not meant to be restrictively defined, but could include other mobile communication units or supervisory routing devices located on the home or foreign networks. Foreign networks can also be called serving networks.

Registering the Mobile Node

Foreign agents and home agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a home agent, a foreign agent, etc.) to a mobile node. Multiple interfaces may also be supported on a single or multiple foreign networks, which can include the different communication access types 802.11d, 802.11g, HRPD, WiFi, WiMax, CDMA, or LTE. Mobile nodes examine the agent advertisement and determine whether they are connected to the home network or a foreign network.

The mobile node will always be associated with its home network and sub-network for IP addressing purposes and will have information routed to it by routers located on the home and foreign network. If the mobile node is located on its home network, information packets will be routed to the mobile node according to the standard addressing and routing scheme.

If the mobile node is visiting a foreign network, however, the mobile node obtains appropriate information from the agent advertisement, and transmits a registration request message (sometimes called a binding update request) to its home agent through the foreign agent. The registration request message will include a care-of address for the mobile node. A registration reply message (also called a binding update acknowledge message) may be sent to the mobile node by the home agent to confirm that the registration process has been successfully completed.

Care-of Addressing and Discontinuity Problems

As part of the registration process, the mobile node maintains connectivity with the home agent or local mobility anchor through the use of a "care-of address." This care-of address is registered with the home agent or local mobility anchor in a table, sometimes called a Binding Cache Entry Table. The registered care-of address identifies the foreign network where the mobile node is located, and the home agent or local mobility anchor uses this registered care-of address to forward information packets to the foreign network for subsequent transfer onto the mobile node.

If the home agent or local mobility anchor receives an information packet addressed to the mobile node while the mobile node is located on a foreign network, the home agent or local mobility anchor will transmit the information packet to the mobile node's current location on the foreign network using the applicable care-of address. This is accomplished by forwarding the information packet to the care-of address where the foreign network will receive the information packet, and forward the information packet to the mobile node on the foreign network. During these communications, the transmission of communication packets between the foreign network and the home agent or local mobility anchor will be performed using a tunneling communication protocol.

The registered care-of address identifies the foreign network where the mobile node is located, and the home agent or local mobility anchor also uses this registered care-of address to forward information packets received from the mobile node located on the foreign network. In this situation, the mobile node may transmit information and communication packets back through the foreign agent to the home agent or local mobility anchor for further processing and transmission to other nodes on the system, such as the correspondence node. The source of the information packets will be identified on the mobile node's packets as the mobile node's care-of address.

The home agent or local mobility anchor will confirm that the mobile node's communications are being transmitted from a valid care-of address for the mobile node before routing, processing, and further transferring the packets received from the mobile node. If the home agent receives an information packet that does not have a valid care-of address as its source, the packets will not be processed further. If the care-of address is valid, the information packet will then be forwarded and routed to the destination by the home agent or local mobility anchor. These communications are sometimes referred to a "tunneled" communication between the foreign network and the home network.

A mobile node may transition and move from one foreign network to another foreign network. Each foreign network is identified by a different care-of address, so the transition of the mobile node from one foreign network to a new foreign network requires a modification of the care-of addresses registered for the mobile node at the home agent or local mobility anchor. During this modification of the care-of addressing resulting from the mobile node transition from one foreign network to another foreign network, problems are sometimes encountered with the maintaining the continuity of the tunneled message transmissions to and from the mobile node through the home agent or local mobility anchor.

For instance, messages addressed to the new care-of address for the new foreign network may not be properly transmitted to the mobile node by the home agent or local mobility anchor until the hand-off to the new foreign network has been fully completed. In fact, prior to the hand-off to the new foreign network being fully completed, communication packets addressed to the new foreign network may be dropped or communication packets may be misdirected to the old foreign network care-of address, both of which will result in a disruption of the continuity of the communication to the mobile node.

Moreover, mobile node information and communication packets being sent from the new foreign network may not be properly recognized because the care-of addressing for the new foreign network has not been registered with the home agent or local mobility anchor. In this situation, the home agent or local mobility anchor may refuse to accept communication packets from the mobile node on the new foreign network prior to the hand-off being fully completed to the new foreign network because the care-of address for the new foreign network is not recognized by the home agent or local mobility anchor as a valid source for such communication packets. These continuity problems cause communication disruption, dropped packets and interruption in continuous service. It is a primary objective of this invention to provide care-of addressing support and continuity of tunneled communication to and from a mobile node where the handover to a new foreign network is being initiated.

SUMMARY OF THE INVENTION

The present invention solves these communication disruption problems during the hand-off transition period by using a pre-handoff registration of a new foreign agent on behalf of the mobile node. The pre-handoff registration message should: (1) identify itself as a pre-hand off registration message, (2) indicate direction of traffic for the pre-handoff registration time period, and (3) specify a lifetime or time period when the pre-handoff registration request will continue to be considered valid. The pre-handoff registration may use a flag indicator or option in a registration message.

The home agent or local mobility anchor will process the pre-handoff registration by adding appropriate values to its Binding Cache Entry Table, which will recognize the care-of addressing for the new foreign network as a valid address associated with the mobile node during the specified lifetime period. The local mobility anchor will accept traffic using the pre-handoff registration care-of address depending on the directionality indicator, but the communication traffic to or from the mobile node will not be disrupted during the transition period. Because the care-of address for the mobile node on the new foreign network can be used to direct communication traffic to or from the mobile node during this transition time period, no disruption of service will be encountered and continuity of service to and from the mobile node will be maintained.

If the lifetime expires before either of these actions occur, the lifetime time period can be over-ridden or updated to extend the time period prior to completion of the hand-off when the pre-handoff request will still be recognized as valid. The pre-handoff registration status of the care-of address can be recognized as the registered care-of address after the new foreign agent sends a proper handoff registration request to complete the hand-off procedure or the former foreign agent requests revocation of its prior registration with the home agent or local mobility anchor.

BRIEF DESCRIPTION OF THE DRAWINGS

The objects and features of the invention will become more readily understood from the following detailed description and appended claims when read in conjunction with the accompanying drawings in which like numerals represent like elements and in which:

The objects and features of the invention will become more readily understood from the following detailed description and appended claims when read in conjunction with the accompanying drawings in which like numerals represent like element.

DETAILED DESCRIPTION OF THE PREFERRED EMBODIMENTS

Figure 1:
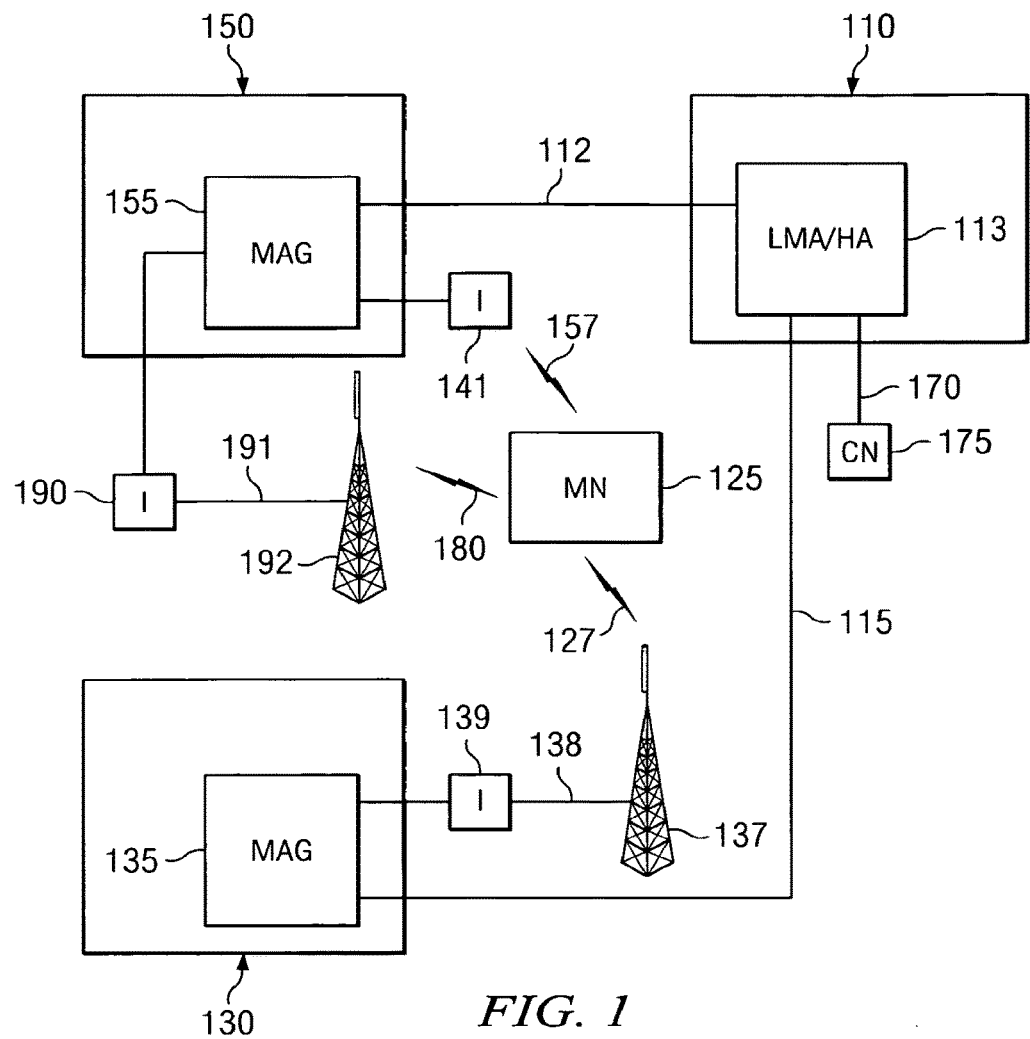
FIG. 1 is a mobile IP-based communication system as used in the present invention; and, FIG. 2 is a message sequence for the mobile IP-based communication system as used in the present invention.

In FIG. 1, the overall architecture of the IP-based mobile system is shown with a mobile node 125, a home network 110 and foreign networks 130 and 150, respectively. As shown in FIG. 1, the home network 110 has a home agent or local mobility anchor 113. The local mobility anchor 113 is coupled to the mobility agent gateway 155 on foreign network 150 by communication link 112, and local mobility anchor 113 is coupled to the mobility agent gateway 135 on foreign network 130 by communication link 115.

A correspondence node CN 175 is coupled to the home network 110 by communication link 170, which can be a connection composed of wire line links, the Internet and/or wireless connections. The correspondent node 175 can include a source of data, voice over IP, or other electronic communication data that is transmitted to or from the mobile node 125. In the present invention, the mobile node 125 may have an on-going communication session with the correspondent node 175 that needs to be maintained when the mobile node is attached to foreign network 130 or the mobile node is transitioning and moving to be connected to the new foreign network 150.

The mobility agent gateway 135 is coupled to the mobile node 125 through the radio access system comprised of the base station transceiver 139 coupled to the antenna/transmitter 137 through the wireless communication link 127. This link represents the existing foreign network supporting the communication with the mobile node 125. In the present invention, the mobile node 125 is transition its connection from the foreign network 130 to the foreign network 150.

When connected to the foreign network 150, the mobility agent gateway 155 will be coupled to the mobile node 125 through the radio access system comprised of the base station transceiver 190 connected by link 191 to the antenna/transmitter 192 and a wireless communication link 180. The mobility access gateways 155 and 135 may work in conjunction with base station transceivers 190 and 139, respectively. The base station transceivers 190 and 139 may also be called evolving node basestation (eNB) depending on the nomenclature used by the particular technology supporting the system.

Mobile node 125 is shown electronically coupled to the foreign networks 150 and 130 via the wireless communication link 180 and 127, respectively. The mobile node 125, however, can communicate with any transceiver or access network coupled to a foreign network. That is, communications links 180 and 127 are radio transmitted links, but these links can be composed of any connection between two or more nodes on a network or users on networks or administrative domains. The mobility agent gateway 155 could also be coupled to the mobile node 125 using a second communication access type, such as WiMax or WiFi, which is supported by the interface 141 and wireless communication link 157.

The terms Local Mobility Anchor, home agent, and foreign agent may be as defined in the Mobile IP Protocol (RFC 2002), but these agents are not restricted to a single protocol or system. In fact, the term home agent, as used in this application, can refer to a home mobility manager, home location register, home serving entity, or any other agent at a home network 110 having the responsibility to manage mobility-related functionality for a mobile node 125. Likewise, the term mobility agent gateway, as used in this application, can refer to a foreign agent, serving mobility manager, visited location register, visiting serving entity, or any other agent on a foreign network having the responsibility to manage mobility-related functionality for a mobile node 125.

In the mobile IP communications system shown in FIG. 1, the mobile node 125 is identified by a permanent IP address. While the mobile node 125 is coupled to its home network 110, the mobile node 125 receives information packets like any other fixed node on the home network 110. When located away from the home network, the mobile node 125 can also connect itself to a foreign network, such as network 130 or 150, to maintain connectivity with the home network through those foreign networks.

The mobile node 125 keeps the local mobility anchor 113 informed of its current location, or foreign network association, by registering a care-of address with the local mobility anchor 113. Essentially, the care-of address represents the foreign network where the mobile node 125 is currently located. When located on foreign network 130 or 150, the home network 110 sends data communications to the mobile node 125 by "tunneling" the communications to the foreign network 130 or 150 using this care-of addressing.

If the local mobility anchor 113 receives an information packet addressed to the mobile node 125 while the mobile node 125 is located on a foreign network 130, the local mobility anchor 113 will "tunnel" the information packet to foreign network 130 for subsequent transmission to mobile node 125.

The foreign agent 135 receives information packets for the mobile node 125 after the information packets have been forwarded to the foreign agent 135 by the local mobility anchor 113. Moreover, the foreign agent 135 serves as a default router for out-going information packets generated by the mobile node 125 while connected to the foreign network 130. When the local mobility anchor 113 receives information packets from the mobile node 125 through the default router foreign agent or mobility agent gateway 135, it will confirm whether the transmission is being initiated from a registered foreign network 130 for the mobile node by confirming the care-of address registered for the mobile node 125.

The communication link 115 between mobility agent gateway 135 on foreign network 130 and the local mobility anchor or home agent 113 is configured as an IP-in-IP tunnel after being set up using a proxy binding update request and a proxy binding acknowledge message. Upon setting up the care-of addressing on the tunneled communication connection with the foreign network, the local mobility anchor or home agent 113 maintains appropriate address entries on a Binding Cache Entry Table, which includes the care-of address for the mobility agent gateway and the home network prefix address.

When the mobile node 125 needs to transition to the new foreign network 150 because of its movement, the communication link 112 is used to communicate with the mobile node 125 over the new foreign network 150. In that instance, communication link 112 will also be configured as an IP-in-IP tunnel. Upon receiving a proxy binding update request that requests registration of the mobile node with the new foreign network 150, the local mobility anchor 113 will set up the care-of addressing on the tunneled communication connection with the foreign network 150, and the local mobility anchor or home agent 113 will modify the care-of address entry on a Binding Cache Entry Table.

The local mobility anchor 113 will register the new care-of address for the mobile node on the new foreign network 150 by registering the mobility agent gateway 155 and the home network prefix address on the Binding Cache Entry Table maintained by the home agent or local mobility anchor 113. The local mobility anchor 113 will respond to the proxy binding update request with a proxy binding acknowledge message sent to the mobility agent gateway 155.

After the hand-off procedure is completed, the local mobility anchor 113 receives an information packet addressed to the mobile node 125 while the mobile node 125 is located on a foreign network 150, and the local mobility anchor 113 will "tunnel" the information packet to foreign network 150 for subsequent transmission to mobile node 125. The foreign agent 155 receives information packets for the mobile node 125 after the information packets have been forwarded to the foreign agent 155 by the local mobility anchor 113. Moreover, after completion of the hand-off protocol, the foreign agent 155 serves as a default router for out-going information packets generated by the mobile node 125 while connected to the foreign network 150. When the local mobility anchor 113 receives information packets from the mobile node 125 through the default router foreign agent or mobility agent gateway 155, it will confirm whether the transmission is being initiated from a registered foreign network 150 for the mobile node by confirming the care-of address registered for the mobile node 125.

This registration process and completion of the hand-off protocol takes a finite time period to complete, and there may be a need to maintain active connectivity of the mobile node with the home agent or local mobility anchor 113 during this transition and registration period. If connectivity is not maintained during the transition period, packets addressed to the mobile node 125 may be misdirected or packets being sent by the mobile node 125 may be dropped.

To maintain connectivity of the mobile node 125 with the local mobility anchor 113 and prevent disruption of the mobile node's 125 communications, the present invention allows for the use of a pre-handoff registration message that is sent to the local mobility anchor 113 prior to completion of the hand-off protocol. The pre-registration request message can be sent to the local mobility anchor 113 by the mobility agent gateway 155 for the foreign network 150 after the mobility agent gateway 155 realizes that the mobile node 125 is moving into the domain of the foreign network 150. The local mobility anchor 113 will register the new foreign network 150 and a provisional care-of address will be assigned to the mobile node 125 through the foreign network 150 during the transition period prior to completion of the hand-off procedure. Appropriate registrations of the provisional care-of address for the mobile node 125 will be made on the local mobility anchor's 113 Binding Cache Entry Table.

The pre-handoff registration message can be composed of a proxy binding update message, but it should: (1) identify itself as a pre-hand off registration message, (2) indicate direction of traffic for the pre-handoff registration time period, and (3) specify a lifetime or time period when the pre-handoff registration request will continue to be considered valid. The pre-handoff registration may specify these details by using flag indicators or options in the proxy binding update registration message. The flag indicators for the pre-handoff registration request may be predetermined fields in the proxy binding update request message, which indicator flags specifying data fields and time periods explicitly or indirectly through associated representative values. A handoff indicator option may also be used where a new value indicates that the proxy binding update request is a pre-handoff registration message, the directionality of the traffic is provided and a lifetime is specified as part of the additional option information.

The lifetime will indicate how long the local mobility anchor 113 should recognize the provisional care-of address for the mobile node 125 on the new foreign network 155, and the direction of the traffic for the pre-handoff registration time period will specify whether the local mobility anchor 113 will allow "uplink traffic" from the mobile node to be sent through the new foreign network 150 during the transition period, "downlink traffic" to the mobile node to be sent to the new foreign network 150 during the transition period, or both "uplink" and "downlink" traffic, which is also called "bidirectional traffic."

The local mobility anchor 113 will accept traffic using the provisional care-of address depending on the directionality indicator, but the communication traffic to or from the mobile node will not be disrupted during the transition period. If the directionality is "uplink traffic," the local mobility anchor will recognize as valid traffic having the provisional care-of addresses being sent from new foreign network 150 and the former foreign network 130. If "uplink traffic" is the directionality indicated, all traffic to the mobile node 125 will be sent to the old care-of address associated with the mobility agent gateway 135 on foreign network 130. If the directionality is "downlink traffic," the provisional care-of address for the mobility agent gateway 155 on the new foreign network 150 will be used for all traffic sent to the mobile node 125. If "bidirectional" traffic is indicated, all traffic to and from the mobile node will be directed through the provisional care of address associated with the mobility agent gateway 155 on the foreign network 150.

The home agent or local mobility anchor 113 will process the pre-handoff registration by adding appropriate values to its Binding Cache Entry Table, which will recognize the care-of addressing for the new foreign network as a valid address associated with the mobile node during the specified lifetime period. The local mobility anchor 113 will respond to the mobility agent gateway 155 with a proxy binding acknowledge message confirming the pre-handoff registration of the new care-of address at the local mobility anchor 113. When communications packets containing the provisional care-of address for the new foreign network 150 are received by the local mobility anchor 113, these packets will be recognized as proper and processed appropriately to make sure the connectivity of the mobile node 125 is maintained. Because the provisional care-of address for the mobile node 125 on the foreign network 150 can be used to direct communication traffic to or from the mobile node 125, no disruption of service will be encountered and continuity of service to and from the mobile node 125 will be maintained.

If the lifetime of the pre-handoff registration expires before the proper handoff protocol is completed, the lifetime time period can be over-ridden or updated to extend the time period prior to completion of the hand-off when the pre-handoff request will still be recognized as valid. The update of the pre-handoff registration status can also modify the provisional care-of address into a formal care-of address to be associated with the new foreign network. The pre-registration care-of address can also be modified by allowing it to serve as the formal care-of address after expiration of the lifetime or after an override request is received by the local mobility anchor 113.

The pre-handoff registration status of the care-of address can be recognized as the registered care-of address after the new foreign agent sends a proper handoff registration request to complete the hand-off procedure or the former foreign agent requests revocation of its prior registration with the home agent or local mobility anchor. While these transitions can modify the pre-handoff registration into a formal hand-off registration, it may be more appropriate for the mobility agent gateway 155 to still send a formal hand-off registration message to the local mobility anchor to assure proper registration of the mobile node 125 on the foreign network 155. After completion of the hand-off protocol, the directionality of traffic will be "bidirectional" with the traffic being sent in both directions to the new care-of address for the new foreign network 150.

Figure 2:
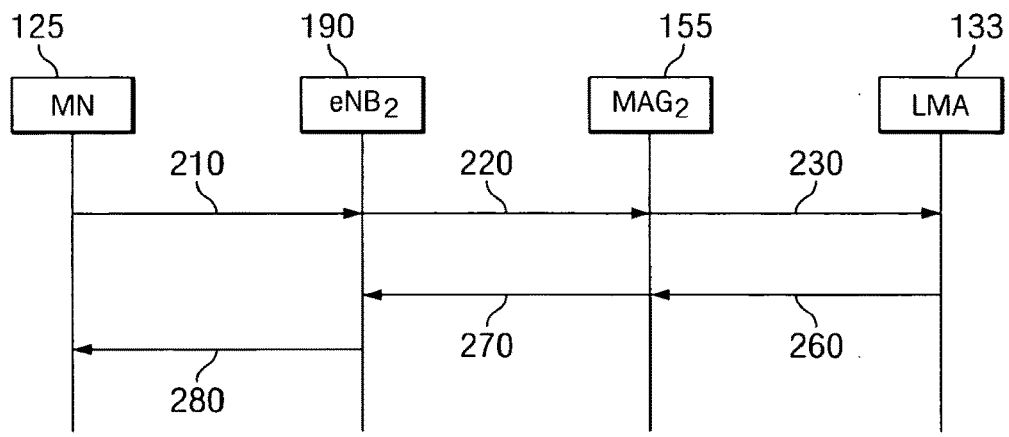

As shown in FIG. 2 and with reference to the system shown in FIG. 1, the message sequence for pre-handoff registration message is initiated by the mobile node 125 when it send a message 210 to the evolving node basestation 190 indicating that it is entering its service area. The evolving node basestation 190 sends a message 220 to the mobility agent gateway 155 on foreign network 150 indicating the future movement of the mobile node 125 onto the foreign network 150. Prior to the transmission of a handoff request or prior to the completion of the hand-off protocol for the transition of the mobile node 125 onto the foreign network 150, the mobility agent gateway 155 sends a pre-handoff registration request message 230 in the form a proxy binding update request to the local mobility anchor 113.

The proxy binding update request message 230 should: (1) identify itself as a pre-hand off registration message, (2) indicate direction of traffic for the pre-handoff registration time period, and (3) specify a lifetime or time period when the pre-handoff registration request will continue to be considered valid. The pre-handoff registration request message 230 may specify these details by using flag indicators or options in the proxy binding update registration message.

The lifetime will indicate how long the local mobility anchor 113 should recognize the provisional care-of address for the mobile node 125 on the new foreign network 155, and the direction of the traffic for the pre-handoff registration time period will specify whether the local mobility anchor 113 will allow "uplink traffic" from the mobile node to be sent through the new foreign network 150 during the transition period, "downlink traffic" to the mobile node to be sent to the new foreign network 150 during the transition period, or both "uplink" and "downlink" traffic, which is also called "bidirectional traffic."

The home agent or local mobility anchor 113 will process the pre-handoff registration by adding appropriate values to its Binding Cache Entry Table, which will recognize the care-of addressing for the new foreign network as a valid address associated with the mobile node during the specified lifetime period. After registration of the provisional care-of address for the mobile node, the local mobility anchor 113 will respond to the mobility agent gateway 155 with a proxy binding acknowledge message 260 confirming the pre-handoff registration of the new care-of address at the local mobility anchor 113. The mobility agent gateway will confirm the pre-handoff registration process with the mobile node 125 by sending a message 270 to the evolving node basestation 190, which is sent onto the mobile node 125.

When communications packets containing the provisional care-of address for the new foreign network 150 are received by the local mobility anchor 113, these packets will be recognized as proper and processed appropriately to make sure the connectivity of the mobile node 125 is maintained. Because the provisional care-of address for the mobile node 125 on the foreign network 150 can be used to direct communication traffic to or from the mobile node 125, no disruption of service will be encountered and continuity of service to and from the mobile node 125 will be maintained.

Modifications of the present invention allow for the directionality indicators to be modified to accommodate different designations or directions of traffic for "uplink" and "downlink" traffic. Further, it should be understood that a care-of address may refer to a proxy care-of address in the specification and the claims, and the mobility agent gateway 113 may de-register mobile node proxy bindings from the initial messaging for as long as security associations are valid and maintained. The mobility agent gateway may also update current mobile proxy bindings or use a binding revocation indication message instead of a de-registration message to delete or modify the mobile node 125 bindings.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Having described the invention, we claim:

1. A method for registering a mobile node on a foreign network during a hand-off transition comprising:
    at a node of a home network:
        receiving a pre-handoff registration request message after the mobile node has initiated a connection to said foreign network but prior to completion of a hand-off to the foreign network, said pre-handoff registration request message including a lifetime time period indicator;
        after processing the pre-handoff registration request, transmitting a registration response confirming the pre-handoff registration for the transitional lifetime time period; and
        using the provisional care-of address to process communication packets associated with the mobile node.

2. The method of claim 1, wherein the pre-handoff registration request further comprises a directionality indicator specifying the direction of traffic associated with the foreign network that will be processed during the lifetime time period, wherein processing the communication packets associated with the mobile node is based on the directionality indicator.

3. The method of claim 2, wherein the pre-hand off registration request specifies uplink traffic as its directionality, which means the local mobility anchor will process communication packets having the provisional care-of addresses being sent from the foreign network on behalf of the mobile node.

4. The method of claim 2, wherein the pre-hand off registration request specifies downlink traffic as its directionality, which means the local mobility anchor will forward communication packets having the provisional care-of addresses to the foreign network sending the pre-handoff registration message for the mobile node.

5. The method of claim 1, wherein the pre-handoff registration request lifetime indicator can be modified to extend the time period for the validity of the provisional care-of address.

6. The method of claim 1, further comprising:
    after completion of hand-off to the foreign network, using the provisional care-of address as the care-of address for the future processing of all communication packets being sent from or sent to the mobile node.

7. The method of claim 1, wherein the node comprises a home agent.

8. A node in a home network configured to register a mobile node on a foreign network during a hand-off transition comprising:
    communication circuitry; and
    processing hardware coupled to the communication circuitry, wherein the processing hardware and the communication circuitry are configured to:
        receive a pre-handoff registration request message after the mobile node has initiated a connection to said foreign network but prior to completion of a hand-off to the foreign network, said pre-handoff registration request message including a lifetime time period indicator;
        after processing the pre-handoff registration request, transmit a registration response confirming the pre-handoff registration for the transitional lifetime time period; and
        using the provisional care-of address to process communication packets associated with the mobile node.

9. The node of claim 8, wherein the pre-handoff registration request further comprises a directionality indicator specifying the direction of traffic associated with the foreign network that will be processed during the lifetime time period, wherein processing the communication packets associated with the mobile node is based on the directionality indicator.

10. The node of claim 9, wherein the pre-hand off registration request specifies uplink traffic as its directionality, which means the local mobility anchor will process communication packets having the provisional care-of addresses being sent from the foreign network on behalf of the mobile node.

11. The node of claim 9, wherein the pre-hand off registration request specifies downlink traffic as its directionality, which means the local mobility anchor will forward communication packets having the provisional care-of addresses to the foreign network sending the pre-handoff registration message for the mobile node.

12. The node of claim 8, wherein the pre-handoff registration request lifetime indicator can be modified to extend the time period for the validity of the provisional care-of address.

13. The node of claim 8, wherein the processing hardware and communication circuitry is further configured to:
after completion of hand-off to the foreign network, use the provisional care-of address as the care-of address for the future processing of all communication packets being sent from or sent to the mobile node.

14. The node of claim 8, wherein the node comprises a home agent.

15. A method for registering a mobile node on a foreign network during a hand-off transition comprising:
at a node:
transmitting a pre-handoff registration request message after the mobile node has initiated a connection to said foreign network but prior to completion of a hand-off to the foreign network, said pre-handoff registration request message including a lifetime time period indicator;
after processing the pre-handoff registration request, receiving a registration response confirming the pre-handoff registration for the transitional lifetime time period, wherein after receiving the registration response, the provisional care-of address is used to process communication packets associated with the mobile node.

16. The method of claim 15, wherein the pre-handoff registration request further comprises a directionality indicator specifying the direction of traffic associated with the foreign network that will be processed during the lifetime time period, wherein processing the communication packets associated with the mobile node is based on the directionality indicator.

17. The method of claim 15, wherein the pre-handoff registration request lifetime indicator can be modified to extend the time period for the validity of the provisional care-of address.

18. A node involved in registering a mobile node on a foreign network during a hand-off transition comprising:
communication circuitry; and
processing hardware coupled to the communication circuitry, wherein the processing hardware and the communication circuitry are configured to:
transmit a pre-handoff registration request message after the mobile node has initiated a connection to said foreign network but prior to completion of a hand-off to the foreign network, said pre-handoff registration request message including a lifetime time period indicator;
after processing the pre-handoff registration request, receive a registration response confirming the pre-handoff registration for the transitional lifetime time period, wherein after receiving the registration response, the provisional care-of address is used to process communication packets associated with the mobile node.

19. The node of claim 18, wherein the pre-handoff registration request further comprises a directionality indicator specifying the direction of traffic associated with the foreign network that will be processed during the lifetime time period, wherein processing the communication packets associated with the mobile node is based on the directionality indicator.

20. The node of claim 18, wherein the pre-handoff registration request lifetime indicator can be modified to extend the time period for the validity of the provisional care-of address.

* * * * *